United States Patent [19]

Kincheloe

[11] Patent Number: 4,685,151
[45] Date of Patent: Aug. 11, 1987

[54] MOTORCYCLE SAFETY APPAREL

[76] Inventor: Dan Kincheloe, 420 Monterey La., Apt. 3-D, San Clemente, Calif. 92672

[21] Appl. No.: 717,071

[22] Filed: Mar. 28, 1985

Related U.S. Application Data

[63] Continuation-in-part of Ser. No. 543,415, Oct. 19, 1983, abandoned.

[51] Int. Cl.$^4$ ............................................. A41D 13/02
[52] U.S. Cl. .......................................... 2/2; 2/DIG. 3
[58] Field of Search ................................. 2/2, DIG. 3

[56] References Cited

U.S. PATENT DOCUMENTS

| | | | |
|---|---|---|---|
| 1,144,150 | 6/1915 | Marcovsky | 2/2 |
| 3,243,822 | 4/1966 | Lipkin | 2/2 |
| 3,550,159 | 12/1970 | Alarco | 2/2 |
| 3,921,944 | 11/1975 | Morrison | 2/2 X |
| 3,930,667 | 1/1976 | Osuchowski et al. | 2/DIG. 3 |
| 4,059,852 | 11/1977 | Crane | 2/2 |
| 4,089,065 | 5/1978 | McGee | 2/2 |

FOREIGN PATENT DOCUMENTS

| | | | |
|---|---|---|---|
| 2499373 | 8/1982 | France | 2/DIG. 3 |
| 1479733 | 7/1977 | United Kingdom | 2/2 |
| 1588919 | 4/1981 | United Kingdom | 2/2 |
| 2099687 | 12/1981 | United Kingdom | 2/DIG. 3 |

Primary Examiner—Louis K. Rimrodt
Attorney, Agent, or Firm—Blakely, Sokoloff, Taylor & Zafman

[57] ABSTRACT

Motorcycle safety apparel is disclosed which may be made in stylish and unencumbering designs to encourage regular use by motorcycle riders, and the like, which in the event of an impending or actual accident will inflate to provide a protective enclosure for the parts of the body most susceptible to critical or fatal injury. In the motorcycle application, the apparel is coupled through an umbilical cord to a container of compressed or liquified gas, with a much shorter pull cord being coupled between the rider and the valve of the container to rapidly inflate the apparel on separation of the rider from the motorcycle prior to separation of the umbilical cord.

36 Claims, 16 Drawing Figures

MOTORCYCLE SAFETY APPAREL

This is a continuation-in-part of application Ser. No. 543,415, filed Oct. 19, 1983. now abandoned

BACKGROUND OF THE INVENTION

1. Field of the Invention.

The present invention relates to the field of protective apparel for motorcycle riders and the like.

2. Prior Art.

It is well known that the survivability of a motorcycle accident, particularly without serious injury, depends strongly on the type and amount of protective clothing worn by the rider. By way of example, a person in ordinary street clothes may well sustain fatal injuries in an accident in which a person simply wearing a helmet would not. Other types of protective clothing which is used to any substantial extent includes boots, heavy clothes such as a leather jacket and perhaps leather pants, and heavy gloves. This type of protective gear has its limitations however, as it tends to be hot, movement restricting and confining, and inconvenient because of the time and effort required to "suit up" from ordinary street clothes. Also while such clothing may be quite protective against abrasion, the impact protection provided thereby is relatively limited as substantial padding is impractical.

It has been proposed that inflatable garments be used by motorcycle riders, which garments will automatically inflate upon separation of the rider from the motorcycle to provide enhanced protection of the rider against impact with other objects. By way of example, U.S. Pat. No. 3,930,667 discloses an inflatable garment for crash protection to be worn by motorcycle riders and to detachably connect with a source of pressurized gas operative to inflate the suit in response to a predetermined deceleration of the motorcycle or manual operation of a trigger adjacent to motorcycle handgrip when a crash or spill appears to be inevitable. In that system, the source of pressurized gas is mounted on the vehicle, with the suit pulling loose from the gas source by a detachable connection therewith.

Another inflatable suit for cyclists is shown in U.S. Pat. No. 4,059,852. This suit utilizes a supply of pressurized gas connected to the suit and triggered by a forced abrupt separation of the motorcyclist's body from the motorcycle to inflate the suit. The suit itself is a full body suit, including a hood, and accordingly requires a zipper not only in the front but along the full length of each leg and along each arm. As such, while the suit would be expected to be useful in protecting the rider, it would also be confining, not aesthetically pleasing, hot and time consuming to get into and out of, and would be expected to badly wrinkle any ordinary clothes worn thereunder. The suit disclosed in the first of the two patents mentioned is similar, in that it is a full body suit covering the torso, arms and legs, though it does not have a hood for the head of the wearer. Finally, clothing for providing protection against forceful impact primarily intended for hand gliding, mountain and rock climbing, parachuting, white water canoeing, race car driving and piloting of experimental aircraft is disclosed in U.S. Pat. No. 4,089,065. Again the suit is a full body suit, except for hood, and is manually inflatable utilizing a pressurized gas container attached thereto. On inflation the suit is intended to balloon quite substantially, extending upward both in the front and back to approximately nose level.

The devices of the prior art undoubtably could be fabricated to be effective, protective devices if regularly used. However, because of their general spacesuit like appearance, their confining characteristics and inconvenient and time-consuming character in putting them on and taking them off, such protective garments are not currently being used. Accordingly, it is one of the primary objectives of the present invention to provide a protective garment which can be made in a stylish form, is as easy to put on and take off as an ordinary jacket and yet which will provide the protection of the prior art garments.

BRIEF SUMMARY OF THE INVENTION

Motorcycle safety apparel is disclosed which may be made in stylish and unencumbering designs to encourage regular use by motorcycle riders, and the like, which in the event of an impending or actual accident will inflate to provide a protective enclosure for the parts of the body most susceptible to critical or fatal injury. In the motorcycle application, the apparel is coupled through an umbilical cord to a container of compressed or liquified gas, with a much shorter pull cord being coupled between the rider and the valve of the container to rapidly inflate the apparel on separation of the rider from the motorcycle prior to separation of the umbilical cord. In one embodiment, the apparel is in the form of a jacket which includes a pleated hoodlike portion normally folded and resting under the jacket collar, and a pleated lower portion so that on inflation the hood will expand upward and then forward around the top and sides of the head, and the lower portion will inflate and expand downward below the knees. Another embodiment comprises a simple belt or cummerbund-like device, which on inflation will expand upward and downward to protect the torso. Various aspects and features of the invention are disclosed.

DETAILED DESCRIPTION OF THE INVENTION

Figure 1:
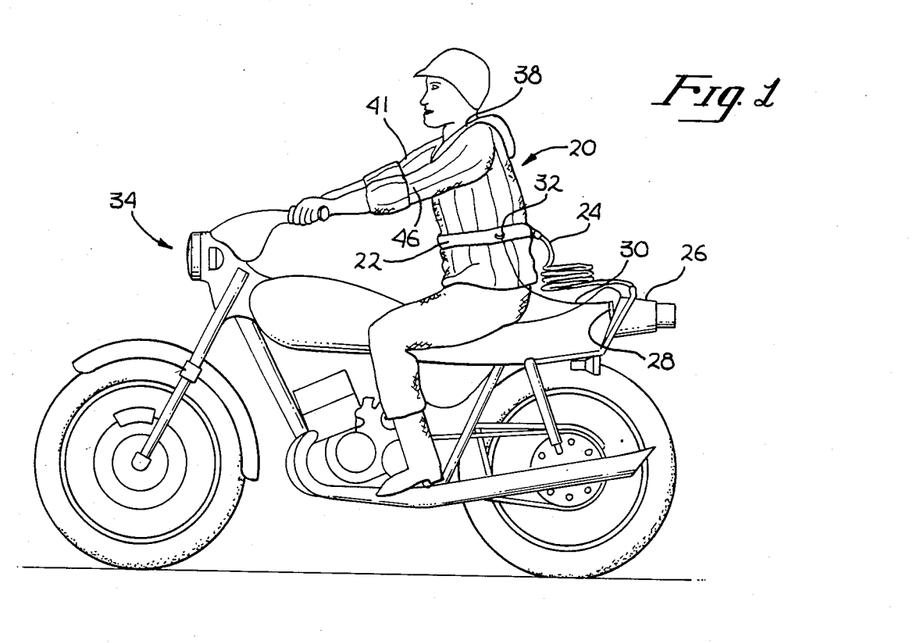
FIG. 1 is a side view of a motorcyclist wearing one embodiment of the present invention.

First referring to FIG. 1, a motorcycle with a rider wearing one embodiment of the present invention may be seen. In this embodiment, the present invention takes the form of a jacket-like garment extending to the normal jacket position around or slightly below the hips, having sleeves of longer than ordinary length, but which may be turned up and retained as shown, and generally otherwise having the appearance of a light ski jacket. The jacket of course may be emblazoned with various decorative insignia and be of selected color or colors to itself serve as an aesthetically pleasing garment and to appear much like a conventional jacket. The structure 22 however is a central manifold-like structure connecting at the back to a coiled flexible and relatively large hose 24 which in turn is connected to a container of pressurized carbon dioxide or other pressurized and/or liquified gas 26 of sufficient quantity and pressure to inflate the jacket in a manner to be described in a very short period of time, and to a suitable pressure to provide a protective air bag enclosure for the most critical portions of the rider's body. The tank 26 may be triggered in various ways, though it is preferred to provide a valve 28 with a valve actuating line 30 coupled to the structure 22 of the jacket by a D-ring or other suitable connection 32. This connection of course is conveniently located and readily manually disconnectable. Similarly the hose 24 is also manually disconnectable from the back of the beltlike structure 22 and will self disconnect when the rider separates from the motorcycle by a distance equal to the length of the hose. Of course line 30 attached to the jacket will open valve 28 so that the jacket will fully inflate long before hose 24 disconnects from the source of the pressurized gas. If liquified gas is used, one might choose to discharge some liquid into the jacket to provide a source of pressurized gas therein even after the hose disconnects.

Figure 2:
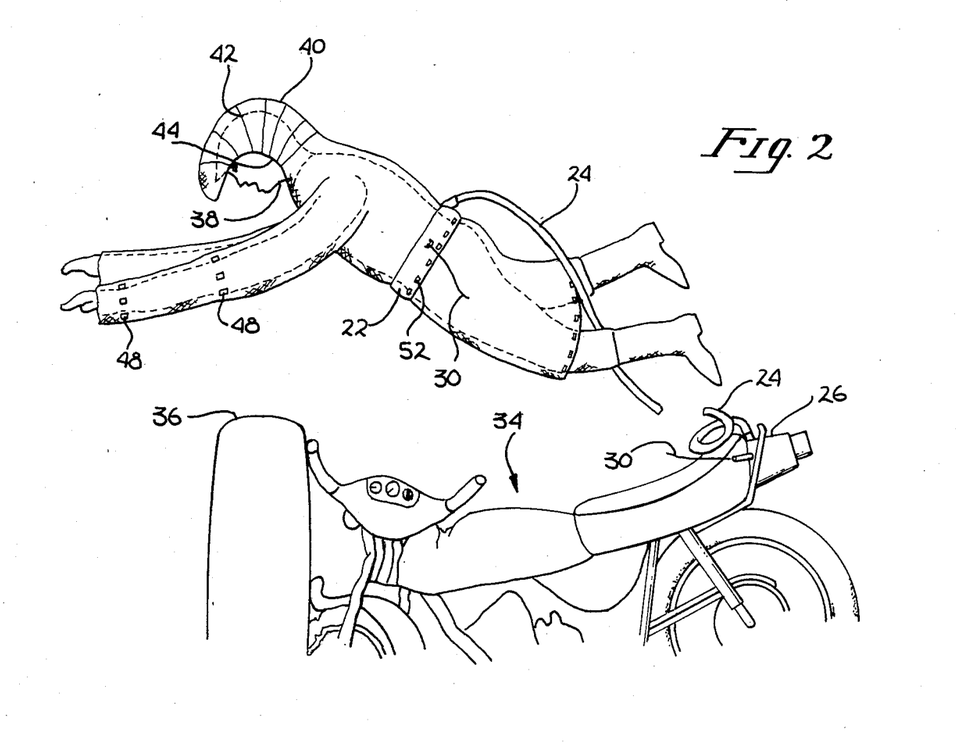
FIG. 2 is a view of the same cyclist with the safety device inflated during an accident.

Now referring to FIG. 2, the operation of this embodiment of the invention in an emergency situation is illustrated. The motorcycle 34 is shown colliding with an obstruction 36 with the rider separating from the motorcycle in a conventional manner by going over the handle bars. Normally when using the present invention, the hose 24 will extend on the order of 6 feet or more with the initial part of the trajectory of the rider being substantially horizontal to provide time for the jacket to inflate and expand into a protective garment before the hose 24 separates from the back of the beltlike structure 22.

It may be seen from FIG. 2 that the jacket of the present invention inflates in a very special way to provide high integrity protection to areas of the body and head well beyond the normal portions of the body over which the jacket fits. In particular the jacket as shown in FIG. 1 is provided with a conventional collar 38 so as to more closely resemble a conventional jacket collar to maintain the aesthetics of the jacket. However, folded below the collar 38 is a protective hood 40 containing multiple pleats 42 about which the hood normally is folded for lying beneath collar 38. If desired, a small Velcro fastener or multiple fasteners may be placed at one or more points along the back edge of the collar to confine the hood in a manner which will allow the release of the fasteners upon pressurization of the jacket to allow the expansion and inflation of the hood up over the head of the rider. In that regard, it should be noted that the hood generally inflates from the bottom up, thereby extending primarily upward on initial inflation before the upper part extending forward over the top of the head inflates to complete the protective enclosure around the head. In the uninflated state, the side region 44 of the hood effectively provides a hingelike attachment structure for the remaining part of the hood so as to maintain the uninflated hood in the folded position beneath the collar 38 without sagging or hanging below the collar. The hood of course normally will be portioned to extend upward over the head of the rider when inflated with some clearance therebetween to clear any cap the rider may be wearing and may be proportioned to extend over a conventional helmet to provide added protection therewith.

Now referring again to FIG. 2, other aspects of the invention may be seen. In particular, it will be noted that the lower part of the jacket has inflated and expanded downward to a position well below the knee, preferably to approximately the level of the top of any boots worn by the rider. This expansion downward serves a number of purposes. In particular, it will be noted first of all, that the expansion downward is by way of an inflatable tubular-like section 20 enveloping both legs of the rider therebetween. This serves the function of not only protecting the legs of the rider but also of helping to keep the body straight to not only prevent severe leg injury by the rider's landing on a leg disposed at a peculiar angle, but also to help prevent back injury by tending to rigidify the entire body structure down to a position below the knees of the body. In that regard, the prior art inflatable suits included inflatable pants which are not only inconvenient to use but which when used in an emergency inflate to provide individual protection for each leg. This has the disadvantage of allowing the legs to flail individually, and provides far less leg and body support than the present invention, as the larger single tubular like structure inflating downward to a position below the knees provides a much more rigid enclosure than two smaller tubular structures. In that regard, it is well known that the strength of a tube or shaft is approximately proportionally to the third power of its diameter, so that the single tubular enclosure for the leg region of the present invention, being over twice the diameter of individual inflatable leg members, will have a resistance to bending on the order of eight times the individual leg members. Further, individual inflatable legs have the additional disadvantage that no significant inflation may occur from the crotch area to some distance therebelow along the leg, as inflation in this area would tend to force the legs to part to encourage injury on impact. As a result, the rigidity of the inflated leg region in the prior art is even further reduced. Also in the event the rider begins to roll, centrifugal force will quickly tend to spread the rider's legs, there again encouraging peculiar leg angles to facilitate leg and back injuries. The present invention on the other hand, capturing both legs as a unit, will have a far greater tendency to keep the body straight and by necessity will keep the legs together in any event.

Finally, it will be noted that while the sleeves 46 of the jacket as shown in FIG. 1 may appear to be of conventional length, they too inflate and expand outward to protect the wrist area and may extend downward to protect the hands depending upon choice of design of the jacket. Thus it may seen that the jacket of FIG. 1 expands upon separation of the rider from the motorcycle to essentially encase the rider within a protective cocoon to protect the rider from abrasion, to hold the body in a substantially rigid form, to minimize back and leg injury, to provide an air bag leg cushion around the body, to cushion impacts with hard objects and to grossly augment the protection provided by any other more conventional protective device worn by the rider such as gloves, helmet and boots.

Figure 3:
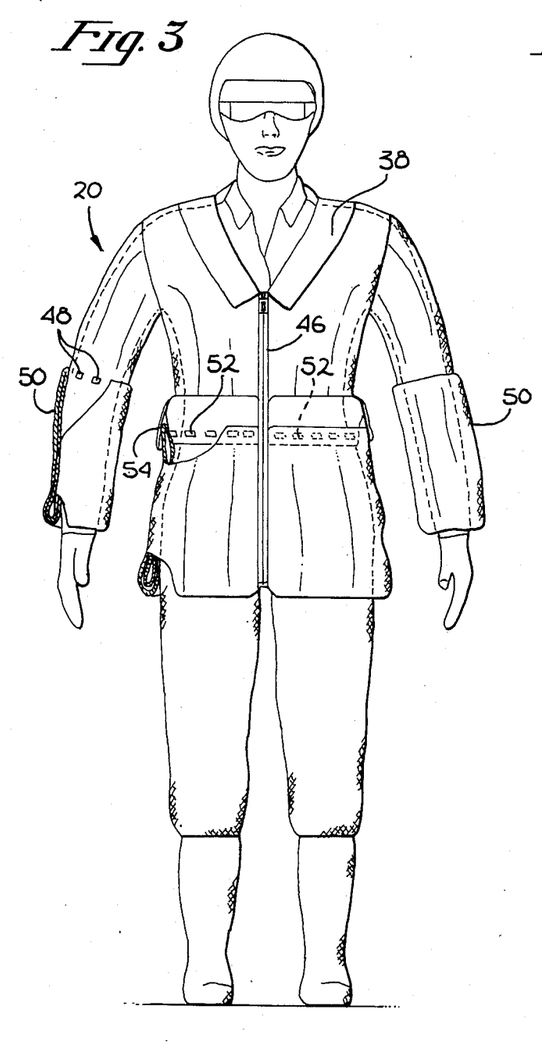
FIGS. 3 and 4 are front and side views respectively of a person wearing the safety device of FIG. 1 in the uninflated condition.
Figure 4:
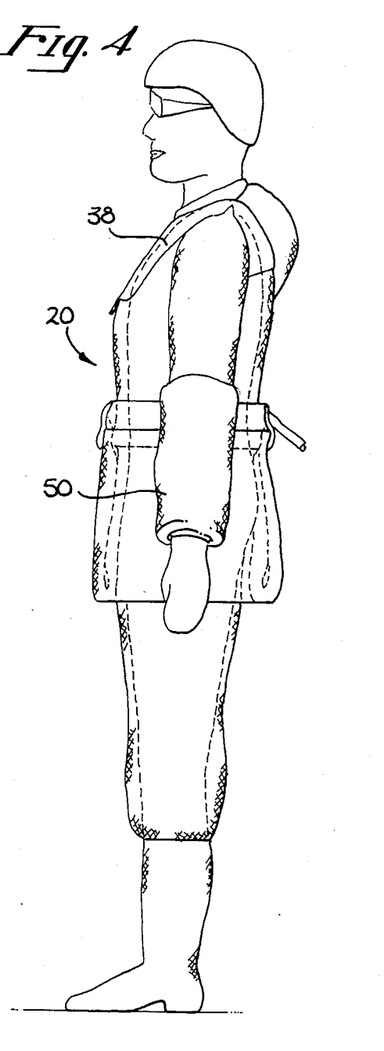

Now referring to FIG. 3 and 4, the front view and side view of a person wearing the jacket 20 of the present invention may be seen. As may be seen particularly in FIG. 3, the jacket is relatively conventional in appearance, having an attractive collar 38, sleeves of appropriate length and of a waist length resembling an ordinary jacket. The fastening of the jacket at the front thereof in the embodiment shown is by a conventional zipper 46, though buttons, buckles, velcro fasteners and alike could also be used. At the wrist regions, the sleeve folds back upward, being releaseably attached in that position by Velcro fasteners 48 cooperatively disposed on the sleeve for quick release under pressure on inflation of the suit (see FIG. 2). In the folded condition shown in FIG. 3, folded regions 50 merely appear as an enlarged cuff region, actually adding to rather than detracting from the style of the jacket. Similarly, in the uninflated state, the lower portion of the jacket which inflates and expands downward below the knees is folded upward and attached to the beltlike structure by additional Velcro fasteners 52 (see also FIG. 1). That attachment as may be seen in FIG. 3 is preferably hidden from sight by an outer flap 54 which otherwise does not restrict the inflation and breaking away of the lower part of the jacket.

Figure 5:
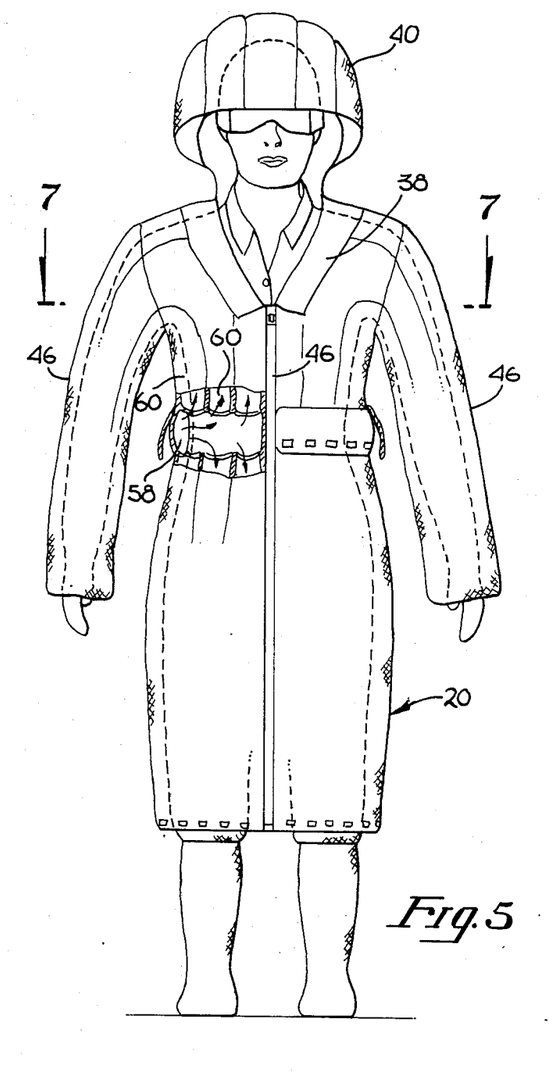
FIGS. 5 and 6 are front and side views of a person wearing the safety device of FIG. 1 in the inflated condition.
Figure 6:
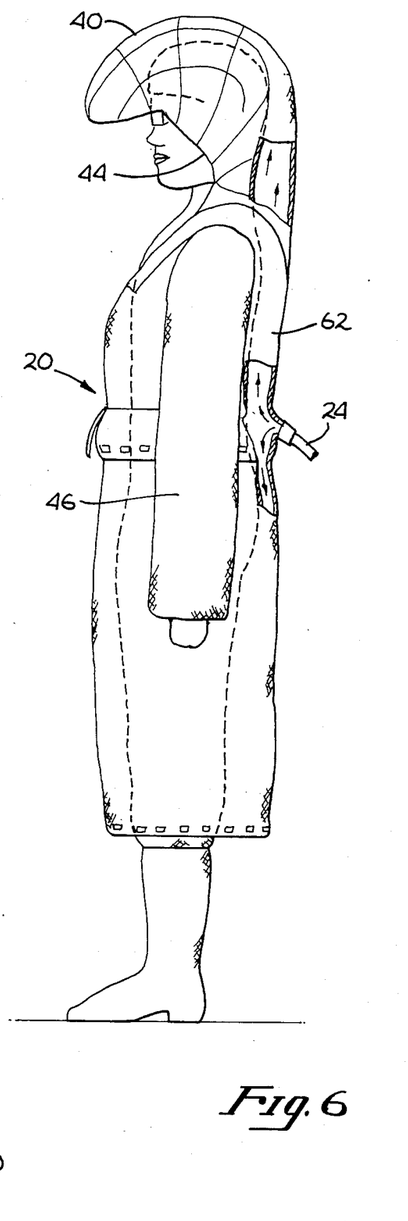
Figure 7:
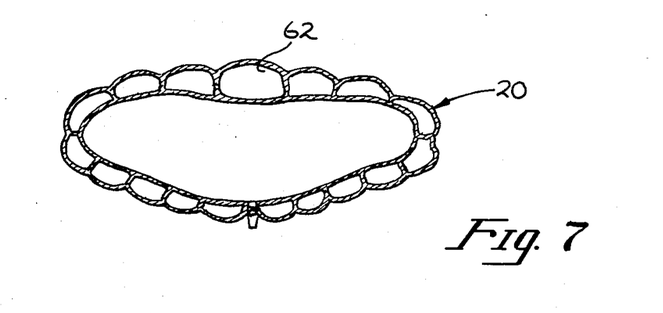
FIG. 7 is a cross section of the safety device taken along line 7—7 of FIG. 5.

The central part 58 of the beltlike region (see FIG. 5) acts like a manifold, receiving pressurized gas from the hose and distributing gas to a plurality of generally vertical tubular sections 60 extending upward and downward therefrom forming the inflatable structure of the jacket. A special heavier tubular member 62 (see FIGS. 6 and 7) extends along the backbone of the wearer, providing special padding and rigidity in that region to further protect and support the particularly vulnerable back region of the rider. FIG. 7 provides a typical cross sectional view of the inflated jacket, illustrating the enlarged backbone region and the preferred cellular structure of the inflated article. Obviously, as may be seen in FIG. 7, the periphery of the inflated jacket is larger than the inner surface, and accordingly must be larger when inflated. The outer surface however, is pleated to gather the extra material in the pleats to avoid any tendency of a sagging or baggy appearance in the jacket. Depending upon the particular material used, Velcro strips, snaps or the like may be used to releaseably retain the pleated material, though some suitable materials will naturally tend to retain the pleated form without special provisions for such retention.

Figure 8:
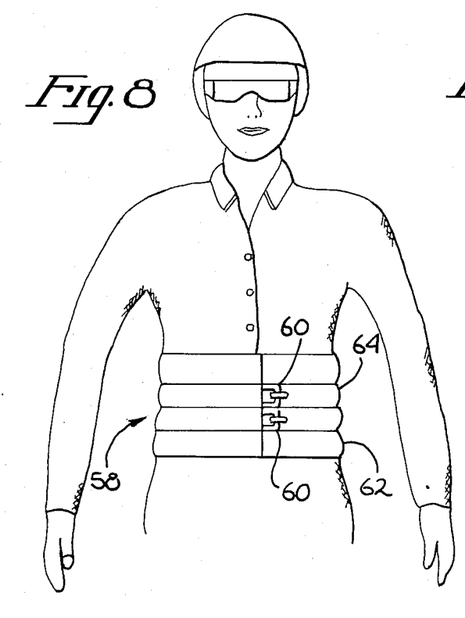
FIGS. 8 and 9 are front and side views of a person wearing an alternate embodiment of the present invention.
Figure 9:
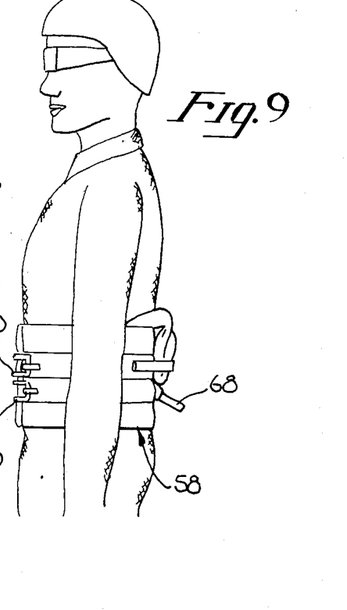
Figure 10:
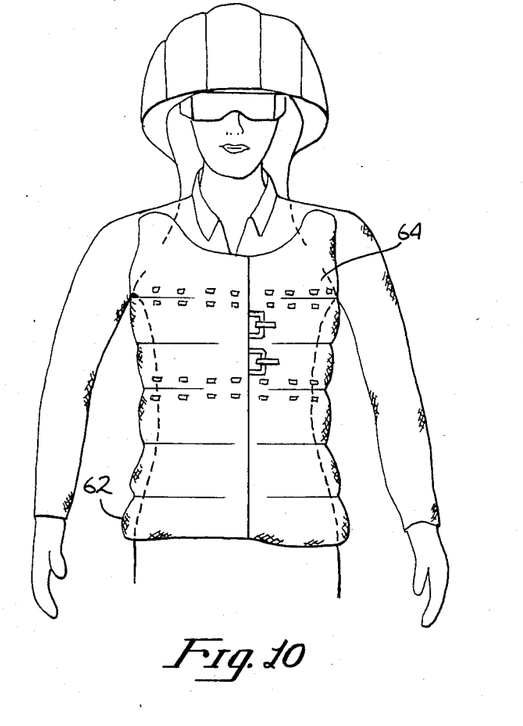
FIGS. 10 and 11 ar front and side views of a person wearing the alternate embodiment of FIGS. 8 and 9 in the inflated condition.
Figure 11:
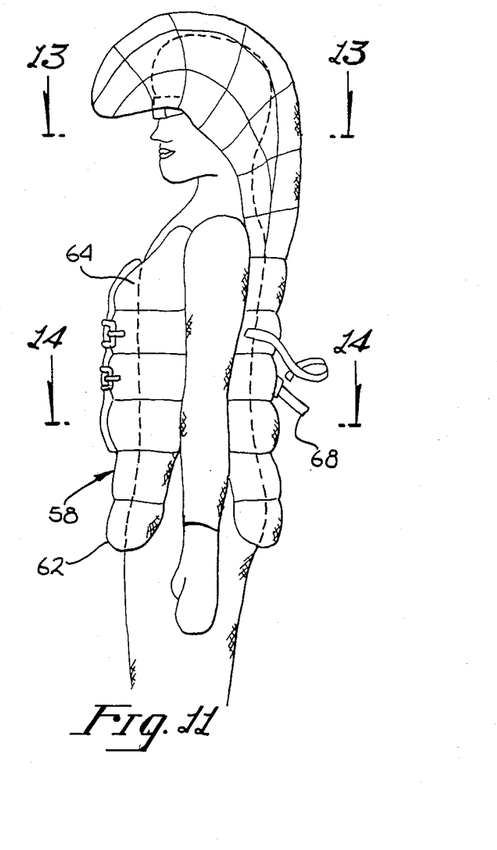
Figure 12:
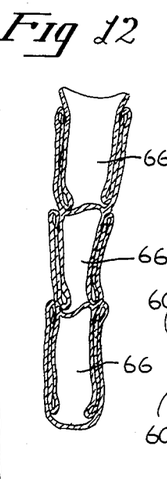
FIG. 12 is a cross sectional of the illustration of the manner of folding and pleating of portions of the present invention.
Figure 13:
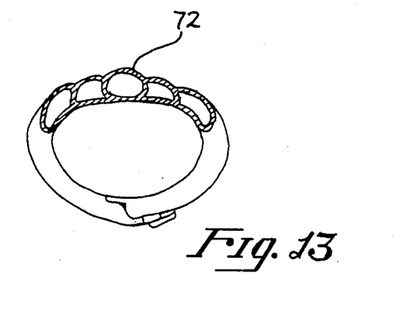
FIG. 13 is a cross section taken along line 13—13 of FIG. 11, illustrating the tubular structure of the hood.
Figure 14:
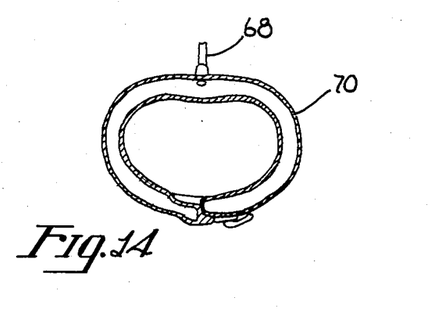
FIG. 14 is a cross section taken along line 14—14 of FIG. 11, illustrating a manifold for distributing the pressurized gas throughout the inflatable structure.

Now referring to FIGS. 8 and 9, an alternate embodiment of the present invention may be seen. This embodiment is generally in the form of a relatively wide beltlike device, generally indicated by the numeral 58, retained by a pair of buckles 60. The device is provided with a pair of flaps 62 and 64, flap 62 being fastened from the bottom of the device and folding upward to be attached adjacent the metal, Velcro or other appropriate fastener, with the top flap 64 folding downward in a similar manner, basically together forming an enclosure for a pleated structure thereunder. In particular, as may be seen in FIG. 12, hooplike tubular regions 66 are provided which in the uninflated condition are folded into themselves to provide a very compact folded structure under the flaps 62 and 64. As before the inflation hose attachment 68 accessible at the back of a central manifold region 70 (see FIG. 14) supplies the tubular structure shown in FIG. 13 with compressed gas, the central back tube 72 again being enlarged to provide extra support and rigidity in that region. On inflation this embodiment is intended to provide protection for the main torso and head, it being recognized that the most serious, permanent or fatal injuries are sustained in these regions. Thus as may be seen in FIGS. 10 and 11, upon inflation flaps 62 and 64 pull away from the fasteners retaining them in the normal position shown in FIGS. 8 and 9, allowing the belt to extend downward to a position just below the hips and upward in front of the chest region and behind the shoulders to protect the upper torso, with the inflatable hood then successively inflating and unfolding to cover the head as with the embodiment of FIG. 1 and 2.

Obviously the embodiment of FIG. 8 through 14 does not provide the same degree of protection as the embodiment of FIG. 1 through 7, and accordingly the embodiment of FIGS. 1 through 7 is preferred. However, it is noted that motorcycle riders frequently resist wearing safety devices of various kinds because of all of the various reasons herein before mentioned. Accordingly the belt device of the embodiment of FIGS. 8 through 14 has the advantage of being very easy to put on and take off, of being cool, of not restricting motion or vision of the rider in any way and of not having a spacesuit like appearance, yet still providing substantial protection to the most critical parts of the body in the event of an accident. Accordingly, this embodiment has the advantage of still further encouraging use thereof in those instances and weather conditions for which a rider will not wear a more complete garment for one reason or another. For that reason, this embodiment is believed to have great utility because it normally will in fact, be used with the resulting extra safety in instances where particularly the prior art full suit safety garments clearly would not.

Figure 15:
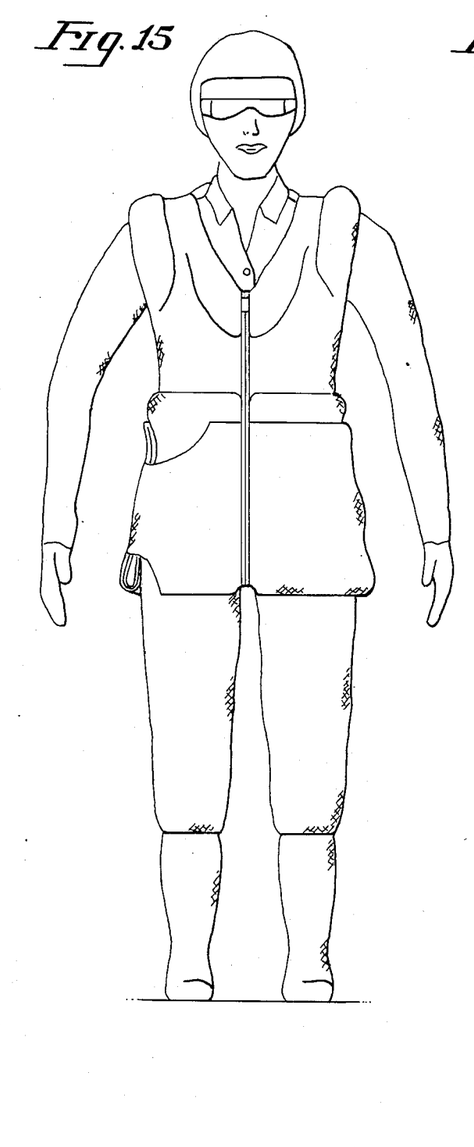
FIG. 15 is a front view of a person wearing a second alternate embodiment of the present invention.
Figure 16:
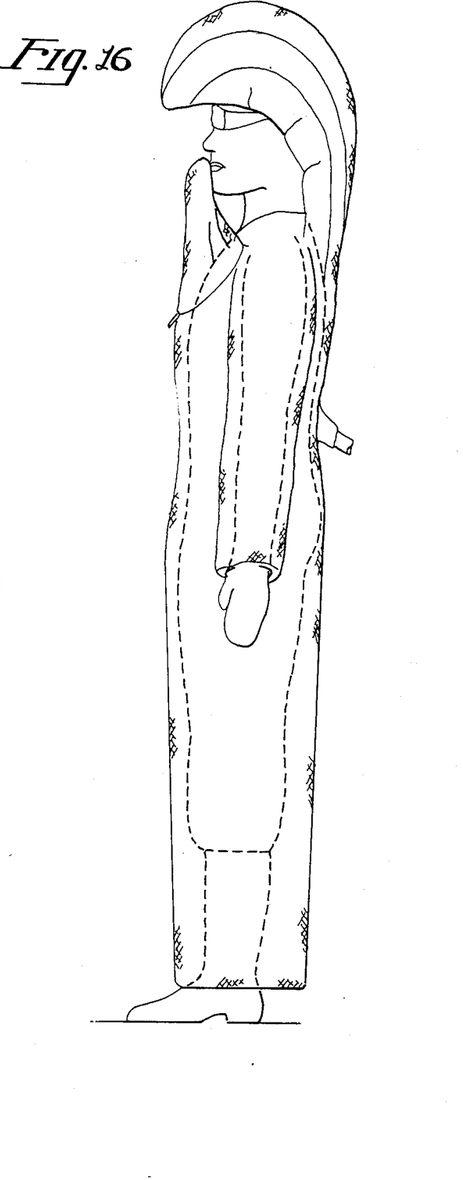
FIG. 16 is a side view of a person wearing the alternate embodiment of FIG. 15 in the inflated condition.

FIGS. 15 and 16 illustrate a second alternate embodiment of the present invention, FIG. 15 being a front view of the alternate embodiment in the normal, uninflated condition and FIG. 16 being a side view showing the embodiment in the fully inflated condition. Like the embodiment of FIGS. 1-7, this third embodiment is in the nature of a jacket 80 worn by the motorcycle rider. However, this third embodiment is more suitable under warmer weather conditions when a jacket with full sleeves would not be desirable. In this connection, as seen in FIG. 15, jacket 80 is a sleeveless jacket having a tank top like appearance. At the shoulder regions, slightly raised portions 82 are used to retain sleeves 84 (see FIG. 16) which expand to encase the arms when the jacket is in the inflated condition. As in the other embodiments, sleeves 84 may be held within portions 82 by velcro fasteners (not shown) or other suitable means. Another feature of this third embodiment (which feature may also be included in the embodiment of FIGS. 1-7) is portion 86 which, in the inflated condition, extends from the chest up to approximately the mid-portion of the face to provide additional protection to the chin, mouth and nose. Inflated portion 86 is normally retained within slit 88 as seen in FIG. 15.

As before, inflation hose attachment 68 attaches to inflation hose 24 and supplies the jacket 80 with compressed gas in the same manner as in the first two embodiments. Thus, although jacket 80 is not a long sleeve jacket as in the FIGS. 1–7 embodiment, as seen in FIG. 16 in the inflated condition, this embodiment provides substantially the same protection as the FIGS. 1–7 embodiment. Additionally, as seen in FIG. 16, the lower portion of the jacket in the inflated condition expands down into a tubular like section 20 extending downward to the tops of the shoes of the rider and enveloping both legs of the rider therebetween.

The safety garments disclosed herein may be fabricated from any number of commercially available materials suitable for such purposes. Preferably a fabric made of a high strength filament using a tight weave may be used, with or without a sealing coating, as a tight weave fabric will hold pressure for some period of time and the safety devices only need to provide the desired air cushion for ten seconds or less in most instances. Thus one material which would be used would be a sail cloth type of material. Another material which would be suitable would be a tight weave fabric utilizing high strength nylon filament such as Kevlar. A third suitable material would be a material such as that employed by manufacturers of air safety bags for use in automobiles. Still other materials are readily commercially available which are substantially non-porous and abrasion resistant and which would be suitable for the purpose. Obviously the specific design, the type of fasteners used, etc., may be varied as best suited to the particular material used, which itself may be somewhat dependent upon the climate conditions, particularly for the jacket type device.

Thus while three embodiments of the present invention have been disclosed herein, it will be obvious to those skilled in the art that various changes in form and detail may be made therein without departing from the spirit and scope of the invention.

I claim:

1. A protetive system for a motorcyclist comprising: a source of a pressurized gas;
a protective device worn around the waist of a person, said protective device being inflatable with pressurized gas to expand and provide protection to the waist region, said protective device further having upper and lower portions generally circumferentially surrounding said waist region and being folded thereabout in the uninflated state, and inflatable to extend substantially upward and downward when inflated with pressurized gas to protect regions above and below the waist of the person;
means for coupling said source of pressurized gas to said protective device; and
means for releasing said pressurized gas into said protective device in the advent of an emergency situation.

2. The protective system of claim 1 wherein said upper portion is in flatable to extend upward over the head of a person wearing the protective device.

3. The protective system of claim 2 wherein said upper portion is inflatable to extend forward over the top and substantial part of the sides of the head of a person wearing the protective device.

4. The protective system of claim 3 wherein said upper portion is progressively inflatable whereby inflation of the upper portion tends to progress upward and then forward to the portion which extends over and to the side of the head of the wearer.

5. The protective system of claim 3 wherein the portion which is inflatable to extend over and to the side of the head of the wearer is folded on pleats when in the uninflated state.

6. The protective system of claim 2 wherein said upper portion includes a portion inflatable to extend over the chin, mouth and nose of a person wearing the protective device.

7. The protective system of claim 1 wherein the protective device in the uninflated condition is folded into the form of a wide belt.

8. The protective system of claim 1 wherein the protective device in the uninflated condition is folded into the form of a jacket.

9. The protective system of claim 8 wherein the jacket in the uninflated condition includes arm sleeves.

10. The protective system of claim 8 wherein the jacket is sleeveless.

11. The protective system of claim 10 including shoulder portions which are inflatable so as to extend at least to the wrists of a person wearing the protection device.

12. The protective system of claim 8 wherein said upper portion is inflatable to extend forward over the top and substantial part of the sides of the head of a person wearing the protective device.

13. The protective system of claim 12 wherein the portion which is inflatable to extend over and to the side of the head of the wearer is folded on pleats and disposed under a collar when in the uninflated state.

14. The protective system of claim 12 wherein said lower portion of said protective device is inflatable to extend downward below the knees of a person using the protective device.

15. The protective system of claim 14 wherein said lower portion may be fastened in a closed form proximate a user's hips and waist to be inflatable downward to enclose both legs of a user within an inflated tube-like structure.

16. The protective system of claim 15 wherein said jacket includes a pair of inflatable sleeves.

17. The protective system of claim 16 wherein said sleeves are folded in the uninflated state so as to not extend below the wrists of a user, and are inflatable so as to extend beyond the user's wrists.

18. The protective device of claim 1 wherein said device is fabricated from a tight weave fabric material.

19. The protective device of claim 18 wherein said material is sail cloth.

20. A protective device worn around the waist of a motorcyclist, said protective device being inflatable with pressurized gas to expand and provide protection to the waist region, said protective device further having upper and lower portions normally circumferentially surrounding said wist region and being folded thereabout in the uninflated state, and inflatable to extend substantially upward and downward when inflated with pressurized gas to protect regions above and below the waist of the person.

21. The protective device of claim 20 wherein said upper portion is inflatable to extend upward over the head of a person wearing the protective device.

22. The protective device of claim 21 wherein the protective device in the uninflated condition is folded into the form of a wide belt.

23. The protective device of claim 20 wherein said upper portion is inflatable to extend forward over the top and substantial part of the sides of the head of a person wearing the protective device.

24. The protective device of claim 23 wherein said upper portion is progressively inflatable whereby inflation of the upper portion tends to progress upward and then forward to the portion which extends over and to the side of the head of the wearer.

25. The protective device of claim 23 wherein the portion which is inflatable to extend over and to the side of the head of the wearer is folded on pleats when in the uninflated state.

26. The protective system of claim 20 wherein said upper portion includes a portion inflatable to extend over the chin, mouth and nose of a person wearing the protective device.

27. The protective device of claim 20 wherein the protective device in the uninflated condition is folded into the form of a jacket.

28. The protective system of claim 27 wherein the jacket in the uninflated condition includes arm sleeves.

29. The protective system of claim 27 wherein the jacket is sleeveless.

30. The protective system of claim 29 including shoulder portions which are inflatable so as to extend at least to the wrists of a person wearing the protective device.

31. The protective device of claim 27 wherein said upper portion is inflatable to extend forward over the top and substantial port of the sides of the head of a person wearing the protective device.

32. The protective device of claim 31 wherein the portion which is inflatable to extend over and to the side of the head of the wearer is folded on pleats and disposed under a collar when in the uninflated state.

33. The protective device of claim 31 wherein said lower portion of said protective device is inflatable to extend downward below the knees of a person using the protective device.

34. The protective device of claim 33 wherein said lower portion may be fastened in a closed form proximate a user's hips and waist to be inflatable downward to enclose both legs of a user within an inflated tube-like structure.

35. The protective device of claim 34 wherein said jacket includes a pair of inflatable sleeves.

36. The protective device of claim 35 wherein said sleeves are folded in the uninflated state so as to not extend below the wrists of a user, and are inflatable so as to extend beyond the user's wrists.

* * * * *

UNITED STATES PATENT AND TRADEMARK OFFICE
CERTIFICATE OF CORRECTION

PATENT NO. : 4,685,151

DATED : 8/11/87

INVENTOR(S) : KINCHELOE

It is certified that error appears in the above-identified patent and that said Letters Patent is hereby corrected as shown below:

| COLUMN | LINE | DESCRIPTION |
|--------|------|-------------|
| 7 | 45 | delete "protetive" insert --protective-- |

Signed and Sealed this

Twentieth Day of September, 1988

Attest:

DONALD J. QUIGG

*Attesting Officer*   *Commissioner of Patents and Trademarks*